United States Patent [19]
Noguchi

[11] Patent Number: 5,582,497
[45] Date of Patent: Dec. 10, 1996

[54] AUTOMATIC WAREHOUSE SYSTEM

[75] Inventor: Hirokazu Noguchi, Tokyo, Japan

[73] Assignee: Wing Labo Co., Ltd., Tokyo, Japan

[21] Appl. No.: 266,603

[22] Filed: Jun. 27, 1994

Related U.S. Application Data

[63] Continuation-in-part of Ser. No. 827,392, Jan. 29, 1992, abandoned.

[51] Int. Cl.$^6$ ........................................ B65G 1/16
[52] U.S. Cl. ........................ 414/281; 414/273; 414/285; 414/286; 414/268; 364/478.02
[58] Field of Search .................... 414/267, 268, 414/269, 270, 271, 272, 277, 286, 278, 273, 276, 331, 281, 288, 282; 364/478

[56] References Cited

U.S. PATENT DOCUMENTS

| | | | |
|---|---|---|---|
| 3,442,403 | 5/1969 | Weir | 414/285 X |
| 3,447,699 | 6/1969 | Weir | 414/285 |
| 3,520,424 | 7/1970 | Lemelson | 414/276 X |
| 4,003,296 | 1/1977 | Wentz | 414/269 X |
| 4,338,056 | 7/1982 | Abrahamson et al. | 414/285 X |
| 5,000,643 | 3/1991 | Tanaka et al. | 414/272 X |
| 5,125,782 | 6/1992 | Goldschmidt et al. | 414/276 |
| 5,156,514 | 10/1992 | Zah | 414/285 X |

FOREIGN PATENT DOCUMENTS

| | | | |
|---|---|---|---|
| 43107 | 4/1981 | Japan | 414/269 |
| 82507 | 5/1985 | Japan | 414/269 |
| 261103 | 10/1989 | Japan | 414/285 |
| 143801 | 6/1991 | Japan | 414/285 |

*Primary Examiner*—Frank E. Werner
*Attorney, Agent, or Firm*—Beveridge, Degrandi, Weilacher & Young, LLP

[57] ABSTRACT

An automatic warehouse has a plurality of stock units. One stock unit has one replenishing rack and one picking rack arranged so as to oppose each other with their sides, leaving a corridor between. Each rack has a plurality of shelves in both heights and length and each shelf has a size which accommodates only one article. Shifting mechanisms are provided for shifting articles to be shifted from shelves in the replenishing rack onto shelves in the picking rack. Replenishing mechanisms are provided for shifting articles to be stocked onto the replenishing rack and picking mechanisms are provided for picking articles to be picked up from the picking rack. Transfer devices are provided for transferring articles from the warehousing berth to the replenishing mechanism and from the picking mechanism to the delivery berth. A controller is provided for controlling the transfer means, replenishing mechanism, shifting mechanism and picking mechanism in such a way that the present location of any article and therewith detailed information about origin, destination, type, age or the like can be recalled and changed at any time.

14 Claims, 9 Drawing Sheets

5,582,497

AUTOMATIC WAREHOUSE SYSTEM

This is a continuation-in-part application of application of Ser. No. 7/827,392, Jan. 29, 1992, now abandoned.

BACKGROUND OF THE INVENTION

1. Field of the Invention

This invention relates to an automatic warehouse system and more specifically to an automatic storage system. This invention is directed to storing and withdrawing articles in an automatic warehouse by using the factors of time and human intervention most economically.

2. Description of the Background Art

With the advance of consumption activities, quick distribution of articles such as commodities or parts has become important. To improve management of distribution of articles, various methods have been proposed.

Since a concentrated management is preferable for managing a great assortment of and a great quantity of commodities of parts, a large scale warehouse is required to realize a concentrated management for both warehousing and distributing commodities of parts. Such warehouses are generally automated, that is forklifts and conveying robots are utilized.

Furthermore, storage facilities have been equipped with gravity roller tracks for transferring articles in a warehouse, particularly for transferring articles from the storage shelves on a conveyor. Examples of such conventional art are disclosed in Tomasello, Jr. (U.S. Pat. No. 4,527,939) and in Lemelson (U.S. Pat. No. 3,520,424).

However, since such racks have been arranged in an uneconomical order, too much time for replenishing and picking procedures is required, combined with a high error rate.

Increased needs for more efficient and more economical warehousing require new, modern, faster facilities and these facilities need to be arranged in a more efficient order allowing to considerably lower the time needed for composing shipment configuration of articles according to an order as well as to reduce the error rate down to a reasonable level. An efficient warehouse system also requires an optimized management of storage capacity relating to factors like e.g. free capacity, number of articles carried in, type of articles, age of the articles, date of storage or the like.

SUMMARY OF THE INVENTION

It is accordingly an object of the present invention to provide an automatic storage and distributing system for the automatic storage and automatic removal from storage of great numbers of pallets, crates, buckets, articles or the like in as short time as possible.

It is another object of the present invention to provide an arrangement of facilities in a warehouse, which allows most efficient and smoothest operation of apparatus and human intervention.

It is a further object of the present invention to provide an automatic warehouse system which can perform stock management or a great number of pallets, crates, buckets, articles or the like in as short time as possible.

It is still further object of this invention to provide various arrangements of apparatus suited to the very needs and cost expectations of the user.

Briefly, these objects are achieved by arranging two racks such that the sides along their longitudinal direction are opposed to each other. Each of the racks has a plurality of shelves in both height and length direction, each shelf having the size to admit only one pallet, crate, bucket, article or the like. Furthermore, one crane or automatic forklift is arranged between of the racks and one crane or forklift is arranged at each of the outer sides of the racks.

Each of the cranes or forklifts at the outer sides of the racks is equipped with one conveyor. The crane or forklift used for replenishing the replenishing rack is supplied by a conveyor with pallets, crates, buckets, articles or the like from the warehousing berth. The crane or forklift used for picking pallets, crates, buckets, articles or the like from the picking rack put the pallets, crates, buckets, articles or the like on a conveyor transferring the pallets, crates, buckets, articles or the like to the delivery berth. The crane or forklift provided between of the racks is used for shifting pallets, crates, buckets, articles or the like from the replenishing rack onto the picking rack.

Various other combinations of racks and cranes or forklifts are to be described hereinbelow as well as a preferred installation of the invention within a warehouse complex.

The present invention is suitable to businesses, wherein a large amount of quantities of articles are to be stored in or withdrawn from a warehouse or manufacturing site in as short time as possible as well as for businesses wherein perishable articles are to be stocked.

BRIEF DESCRIPTION OF THE DRAWINGS

The invention will be explained in detail with reference to the following drawings which illustrates some examples of arrangement and construction, in which.

DETAILED DESCRIPTION OF THE PREFERRED EMBODIMENTS

An embodiment of the storage system and a preferred arrangement in an automatic warehouse according to the present invention will be described hereinbelow with reference to the attached drawings.

Figure 1:
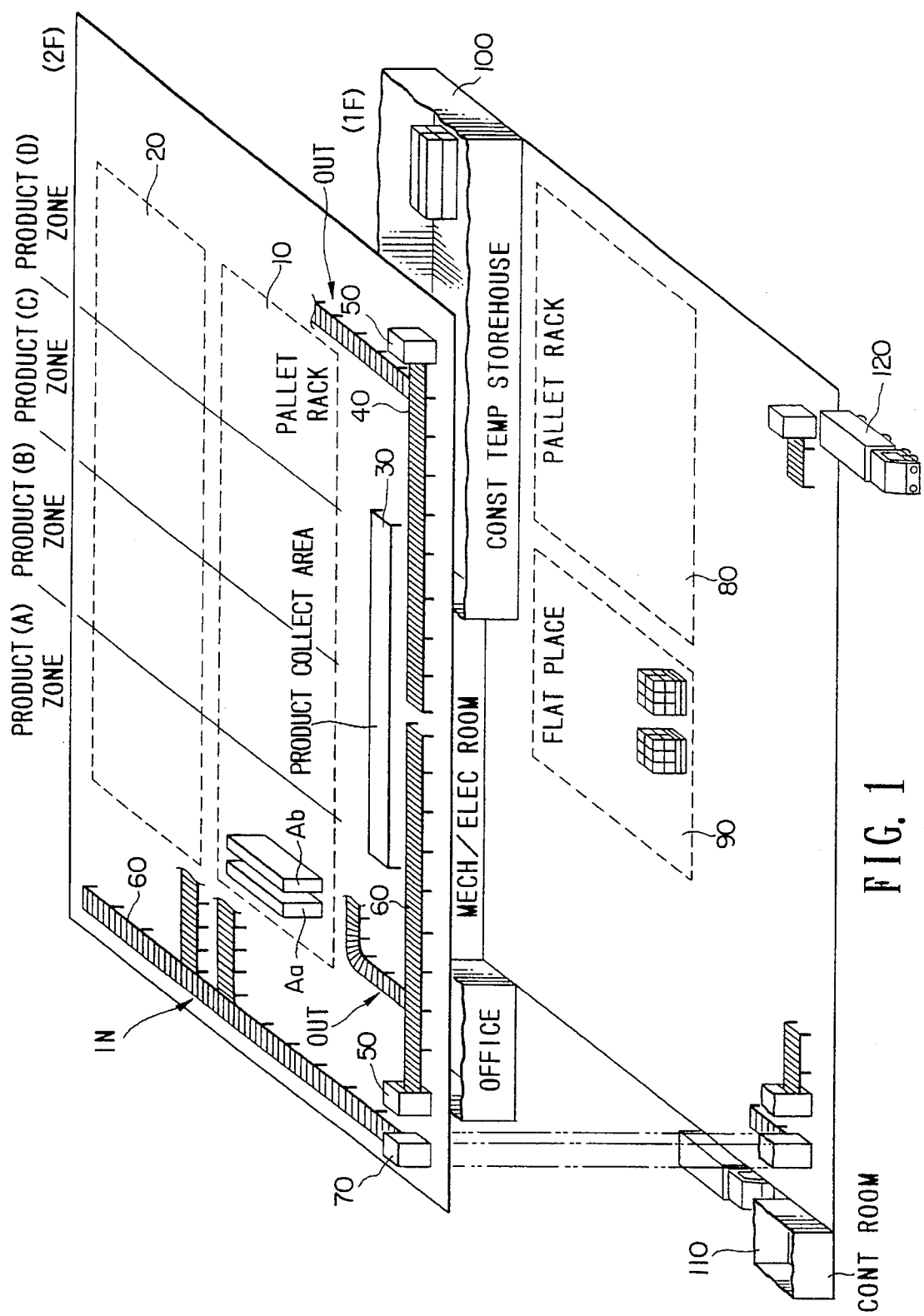
FIG. 1 shows a perspective view of entire automatic warehouse according to the present invention.

FIG. 1 is a perspective view showing an entire configuration of the automatic warehouse according to the present invention, which is suitable for performing stock management of products in a manufacturing plant, for instance.

This automatic warehouse is a two-story building. In the second floor, there are provided a plurality of pallet rack areas 10 and 20 where a number of pallet racks are arranged according to FIGS. 2–9, and various facilities for warehousing and delivering products. In the first floor, there are provided a pallet rack area 80 of the same type as in the second floor, a flat place 90 on which pallets can be placed directly on the floor, a constant temperature storehouse 100, and a computerized control room 110, etc.

The warehousing berth and the delivery berth are preferably located on the first floor, whereas the racks are preferably located on the second floor in a warehouse, allowing the most economical using of transfer means like conveyors or lifts.

The pallet rack areas provided for the second floor will be first described. Each of the areas 10 and 20 is divided into a product (A) zone, a product (B) zone, a product (C) zone, and a product (D) zone. Furthermore, at least one rack combination according to FIGS 2–9 provided with a plurality of shelves having plural sections is arranged from each zone. Products are stocked in each of these sections. Here, the pallet is defined as a plate to be carried.

In FIG. 1, a product replenishing rack Aa and a product picking rack Ab are arranged in the product (A) zone of the pallet rack area 10.

The product collecting area 30 is provided at roughly the front middle position of the second floor, and the products picked out of the pallet racks are collected and packed up so as to be conveyed easily. That is, since the packed up product status is opposite to the unpacked product status, it is preferable to first carry out the products unloaded from the truck.

In the vicinity of the product collecting area 30, an end of a belt conveyor 40 for carrying out the products is located to convey the collected products from the pallet rack areas 10 and 20 to the elevator 50 installed on the right end side of the second floor. This elevator 50 is located at the delivery berth on the first floor so that the collected products can be delivered immediately by a truck 120.

That is, the elevator 50 moves down the pallet having products collected on the second floor to the first floor.

Furthermore, in FIG. 1, another belt conveyor 60 for stocking the products is installed on the left side of the pallet rack areas 10 and 20 and is connected to conveying facilities which transfer the products to the replenishing device in the pallet rack area 10 and 20. An end of this conveyor 60 is connected to another elevator 70 located at the warehousing berth on the first floor so that the products can be stocked by another truck. That is, the elevator 70 moves up the products carried to the automatic warehouse to the second floor.

All facilities, apparatus and means are controlled by a computer system which allows the invention to carry out storage and withdrawal of articles without human intervention. The computer system will address a code to each article allowing the user to recall at any time any coded information e.g. location of this articles, content, age or the like from the controlling computer unit.

The core of the present invention is a pair of two racks (a replenishing rack and a picking rack) arranged so as to oppose each other with their sides along the longitudinal direction, having a corridor therebetween. Each rack comprises a plurality of shelves provided in both height and length directions. The number of shelves in a rack depends on the needs of the user. The less shelves that are comprised in a rack, the less time is required to transfer a pallet, crate, bucket, article or the like from a conveyor onto a rack (replenishing) or vice verse (picking). But the less shelves are comprises in a rack, the higher would be the costs for one shelf relative to the cost of the whole system.

Each shelf can store only one pallet, crate, bucket, article or the like. The size of the shelves relates to the size of the pallets, crates, buckets, articles or the like, which are to be stocked in the rack. The pallets, crates, buckets, articles or the like area stored in and withdrawn from the racks by using cranes of forklifts which move on rails or the like disposed longitudinally along the racks. The cranes or forklifts shift the pallets, crates, buckets, articles or the like in a vertical direction and in a horizontal direction. The cranes or forklifts can be arranged in different combinations, depending on how fast the storage and removal have to be managed and on the cost expectations of the user when ordering such a system.

Figure 2:
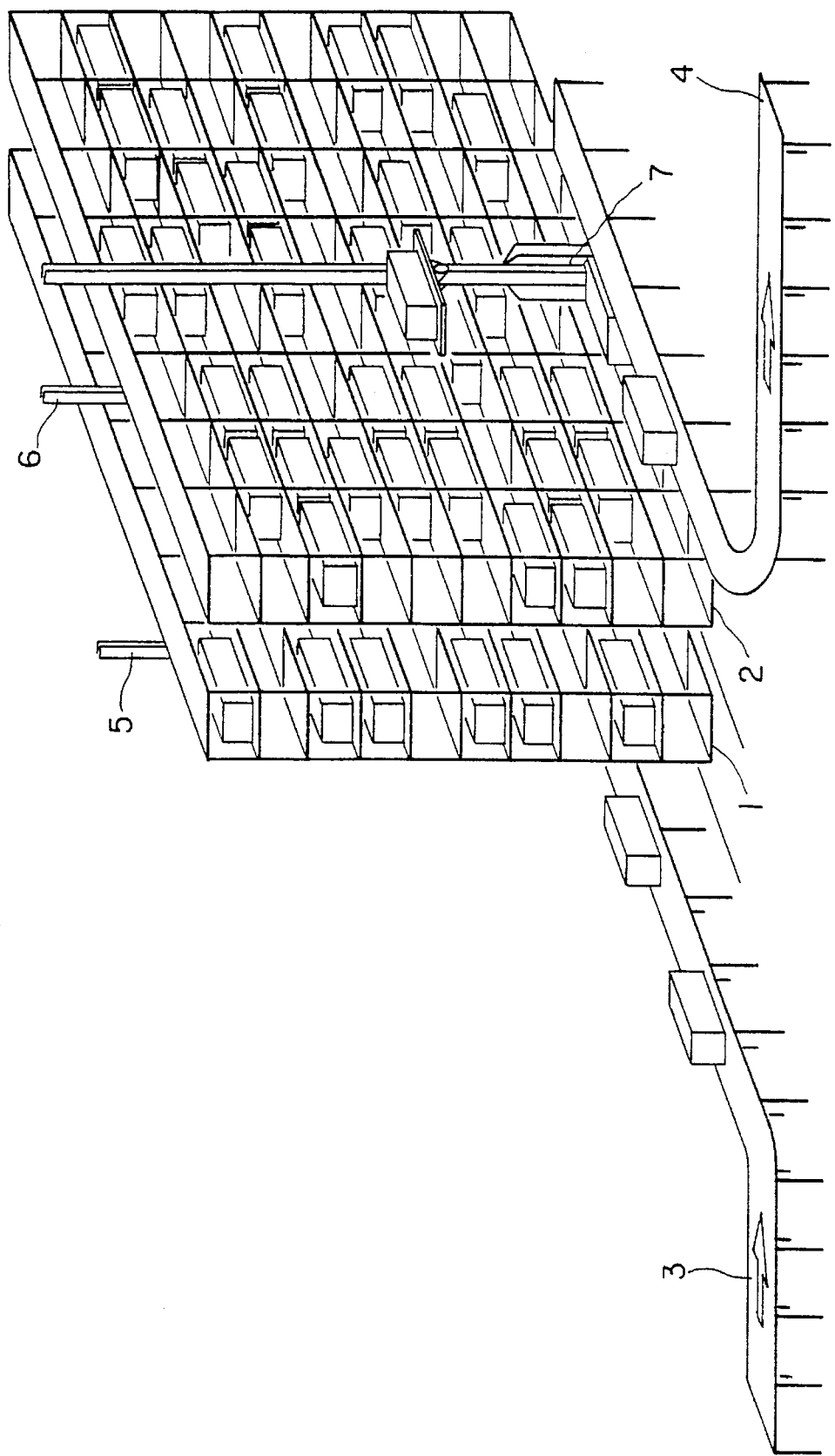
FIG. 2 shows a perspective view of the rack arrangement according to the invention.
Figure 3:
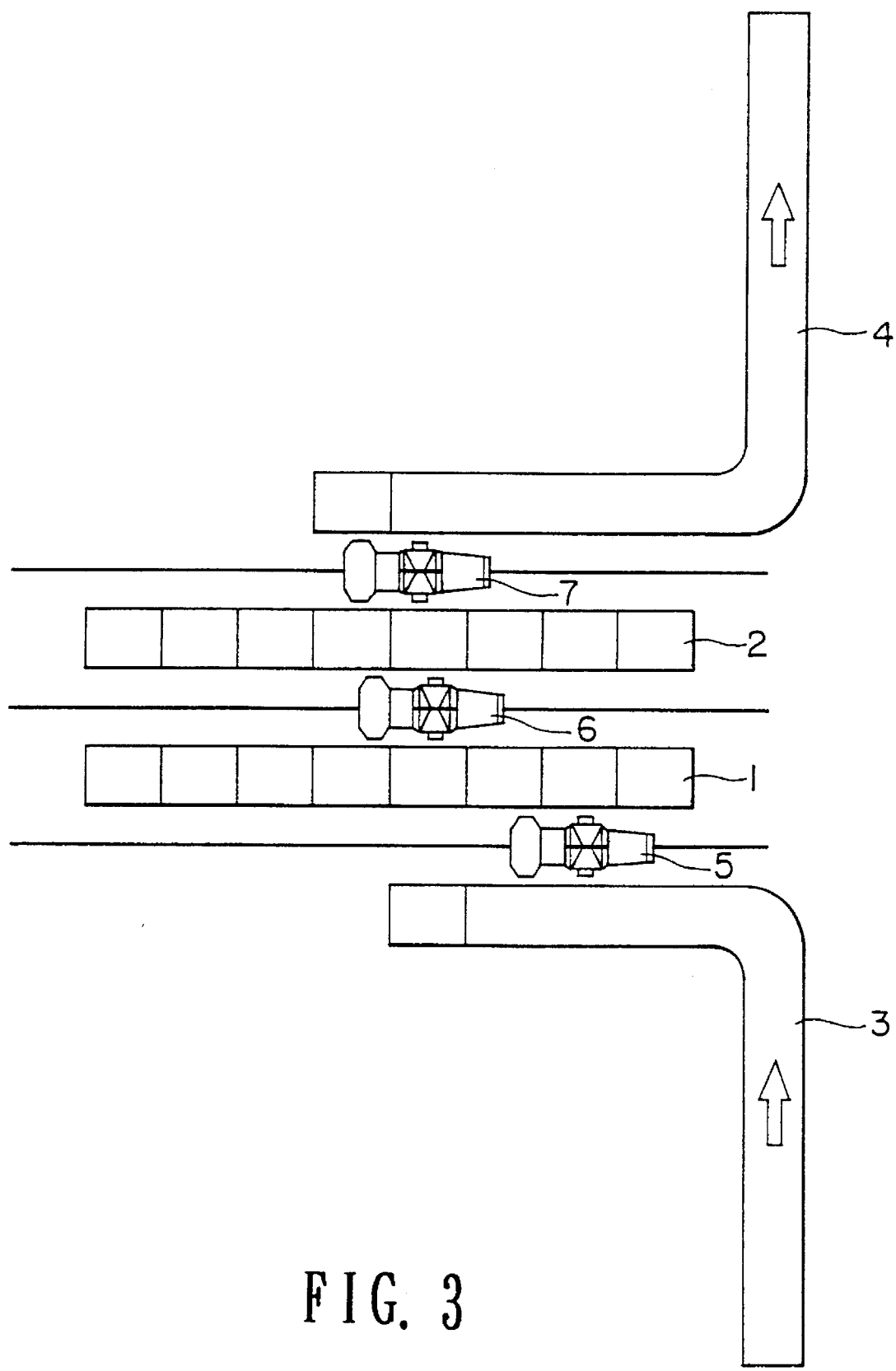
FIG. 3 shows a plan view of a combined installation according to the invention with transfer means for each replenishing mechanism and picking mechanism.

FIGS. 2 and 3 show the first arrangement which will be the most time-economical arrangement. This arrangement is a stock unit having a replenishing rack 1, a picking rack 2, three cranes 5, 6, 7 and two transfer means 3, 4 e.g. conveyors or automatic carts. In this embodiment and following embodiments, the cranes can be replaced by forklifts or other facilities.

The racks are arranged as described hereinabove as to oppose each other with their sides. One rack (replenishing rack 1) is used for interim-storage of articles and the other rack (picking rack 2) is used for stocking articles ready to be picked out. Two cranes 5 and 7 are arranged along the outer sides of the unit, whereas the third crane 6 is arranged along the inner sides of the unit, within the corridor left between the two racks 1, 2.

The crane 5 as a replenishing mechanism at the outer sides shifts articles from the transfer means 3 onto the replenishing rack, when empty shelves are to be replenished. The crane 7 as a picking mechanism at the other outer side of the unit shifts articles to be picked out from the picking rack 2 onto the transfer means 4.

The crane 6 in the center of the unit shifts articles from the replenishing rack 1 onto the picking rack 2, when the calculated total number of articles in the picking rack 2 is reduced down to a predetermined number.

As a result, the crane 7 as the picking mechanism picks articles from the picking rack 2 according to orders generated from a control unit. At the same time and according to orders from the control unit, the shifting mechanism 6 shifts articles from the replenishing rack 1 onto predetermined shelves within the picking rack 2 allowing the picking mechanism 7 to work without interruption. Again at the same time, the crane 5 as the replenishing mechanism replenishes the replenishing rack 1 according to orders from the control unit, allowing the shifting mechanism 6 to work without interruption.

In this arrangement, none of the cranes are adapted to carrying out two works together, because e.g. simultaneous picking and replenishing would result in interruptions of the picking procedure for replenishing shelves. The separation of the works of the cranes, in either replenishing or shifting or picking allowing all works to be done at the same time, allows the time required for stocking in articles and for composing orders to be considerably reduced. Therefore, this arrangement is suitable for businesses wherein warehousing is to be operated in as short a time as possible like e.g. for warehousing of perishable goods. Further advantage of the invention is that erroneous picking would be reduced due to precise definition of crane operations.

Figure 4:
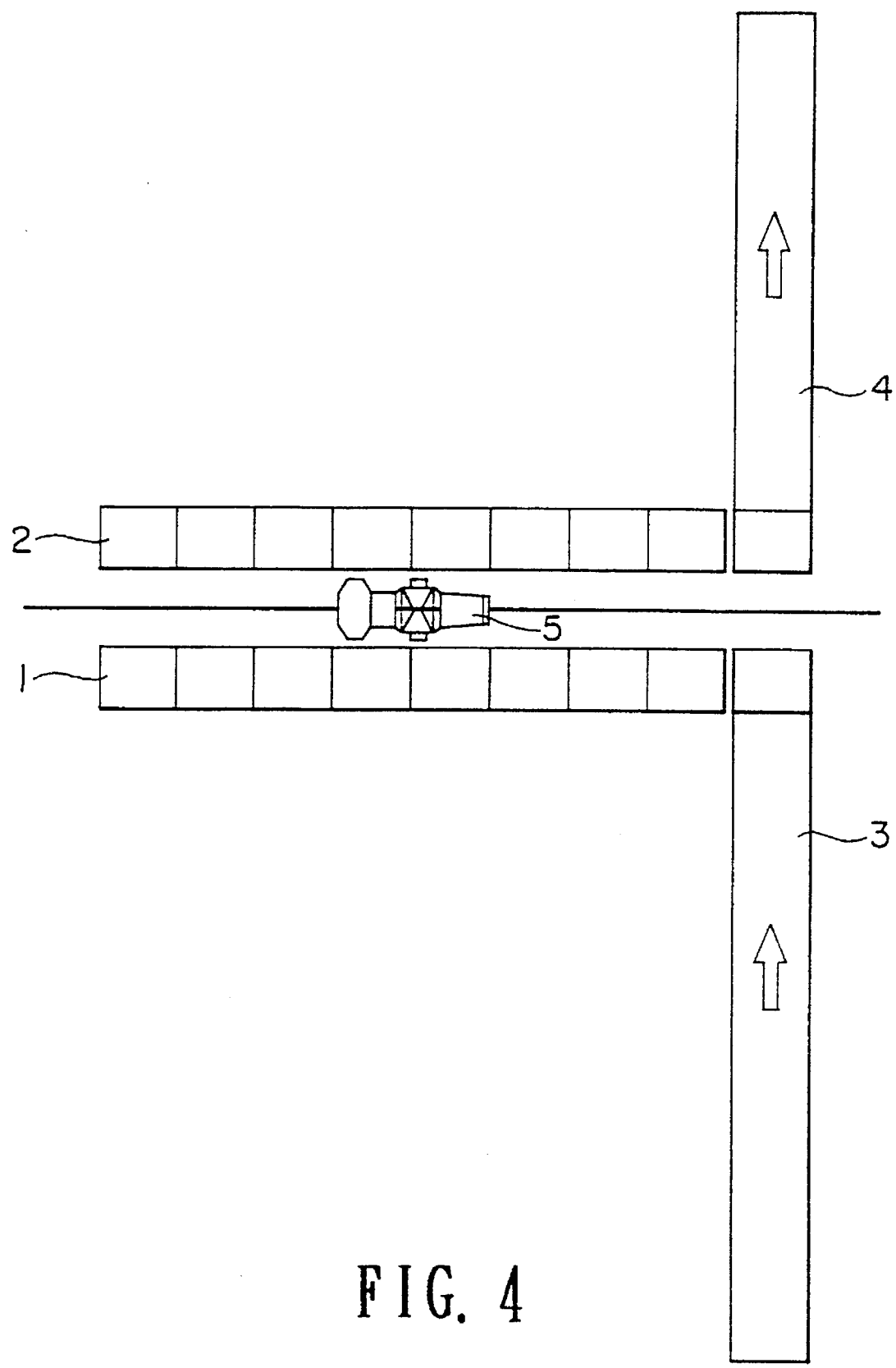
FIG. 4 shows a plan view of another example of a combined installation according to the invention.

FIG. 4 shows the second embodiment of the present invention which uses only one crane 5 or forklift located between the two racks 1 and 2, which is used for replenishing and picking of pallets, crates, buckets, articles or the like. It is equipped with two conveyors 3, 4 at one end of the corridor between the racks 1 and 2. One conveyor 3 supplies pallets, crates, buckets, articles or the like from the warehousing berth to the crane 5, whereas the second conveyor 4 transfers pallets, crates, buckets, articles or the like from the crane 5 to the delivery berth.

Figure 5:
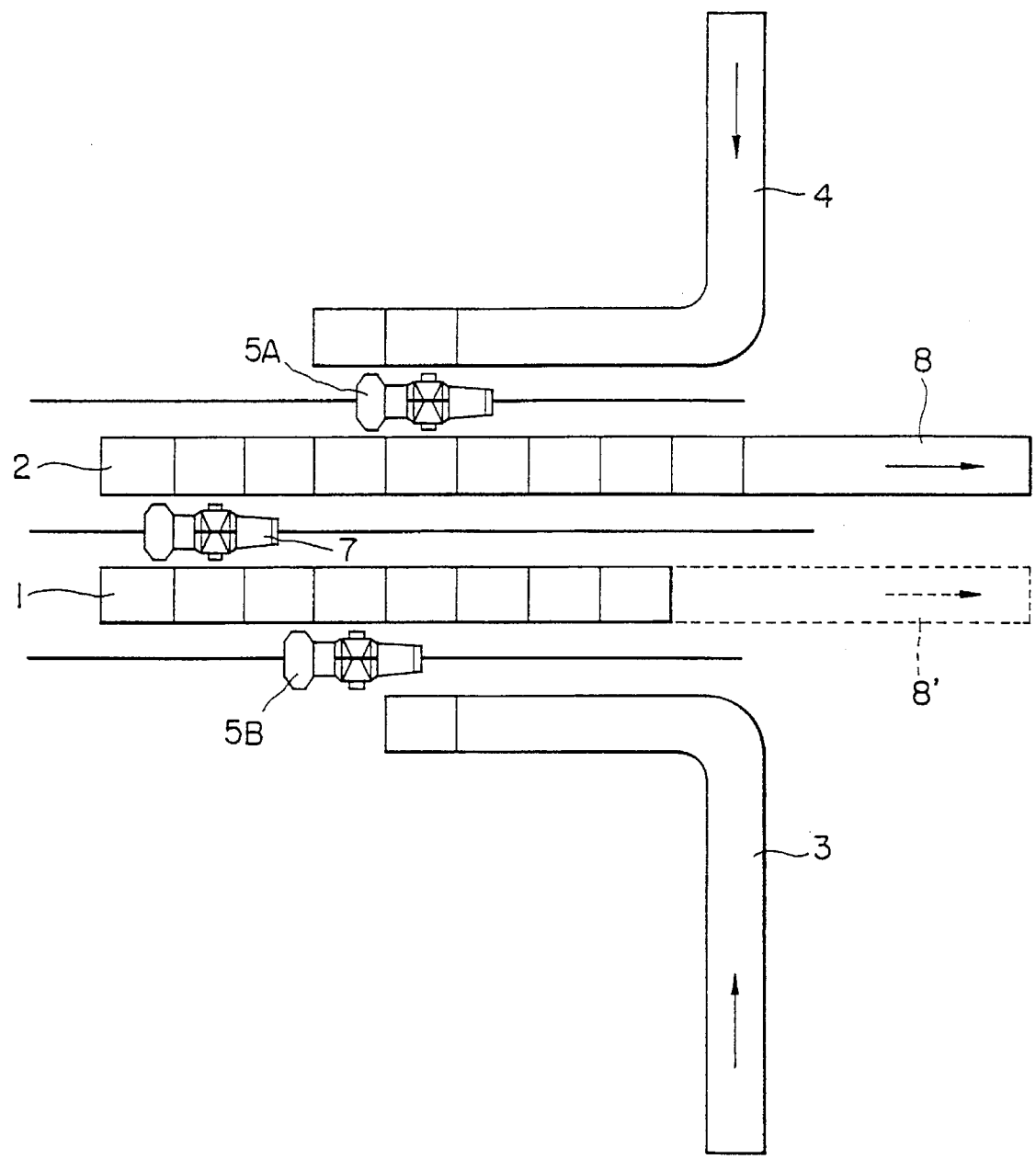
FIG. 5 shows a plan view of another example of a combined installation according to the invention.

FIG. 5 shows the third embodiment which has a similar arrangement to FIG. 3. However, according to this embodiment, the two outer cranes 5A and 5B provided at the sides of two racks 1 and 2, respectively operate as the replenishing mechanism. Furthermore, the center crane 5 operates as the picking mechanism.

Figure 6:
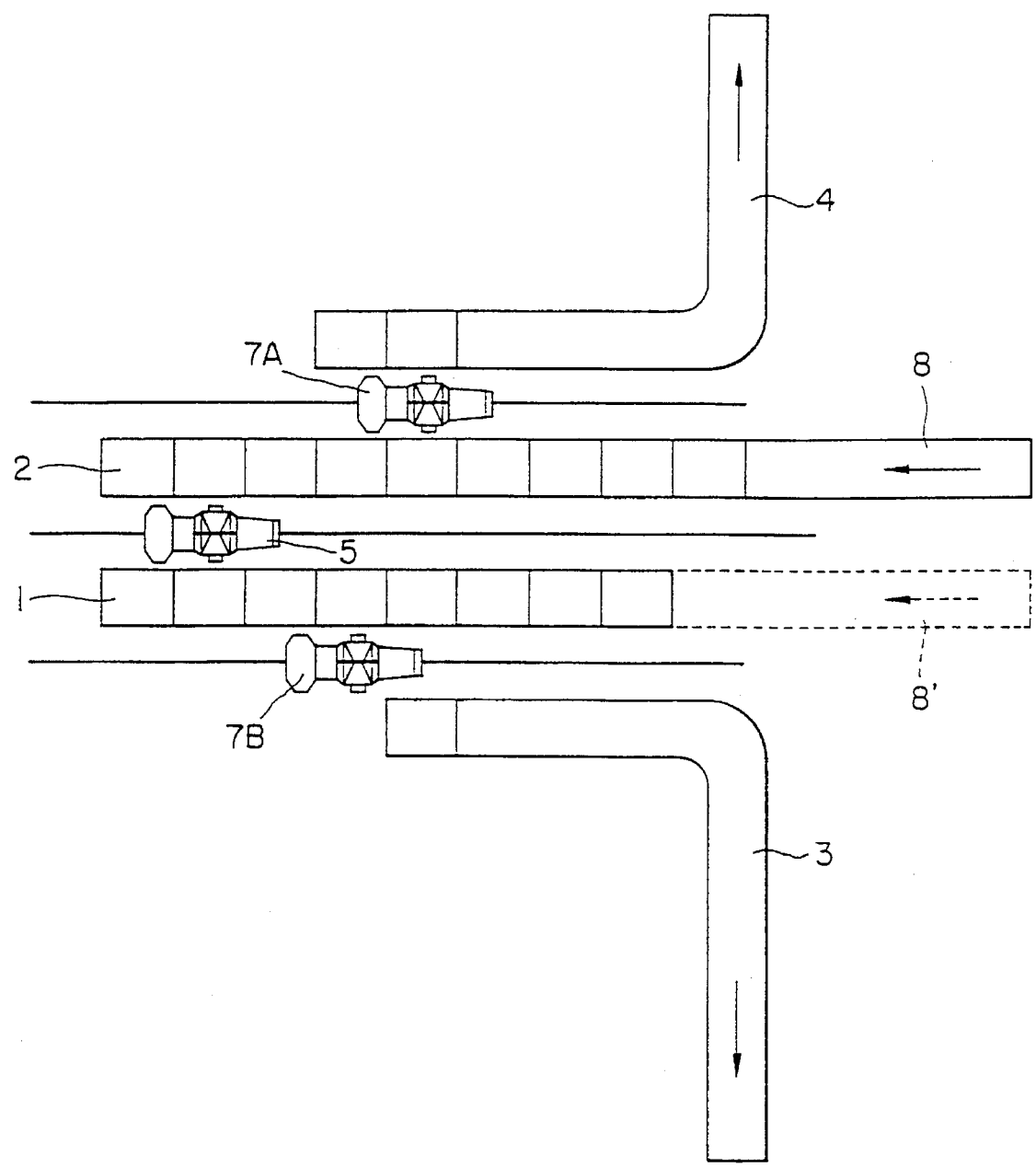
FIG. 6 shows a plan view of another example of a combined installation according to the invention.

FIG. 6 shows the fourth embodiment. In this embodiment, the flow of the articles are reversed comparing to the third embodiment of FIG. 5. That is, two picking mechanisms 7A, 7B are located at the outer sides of the stock unit and one replenishing mechanism 5 is located within the corridor between the two racks 1 and 2.

Figure 7:
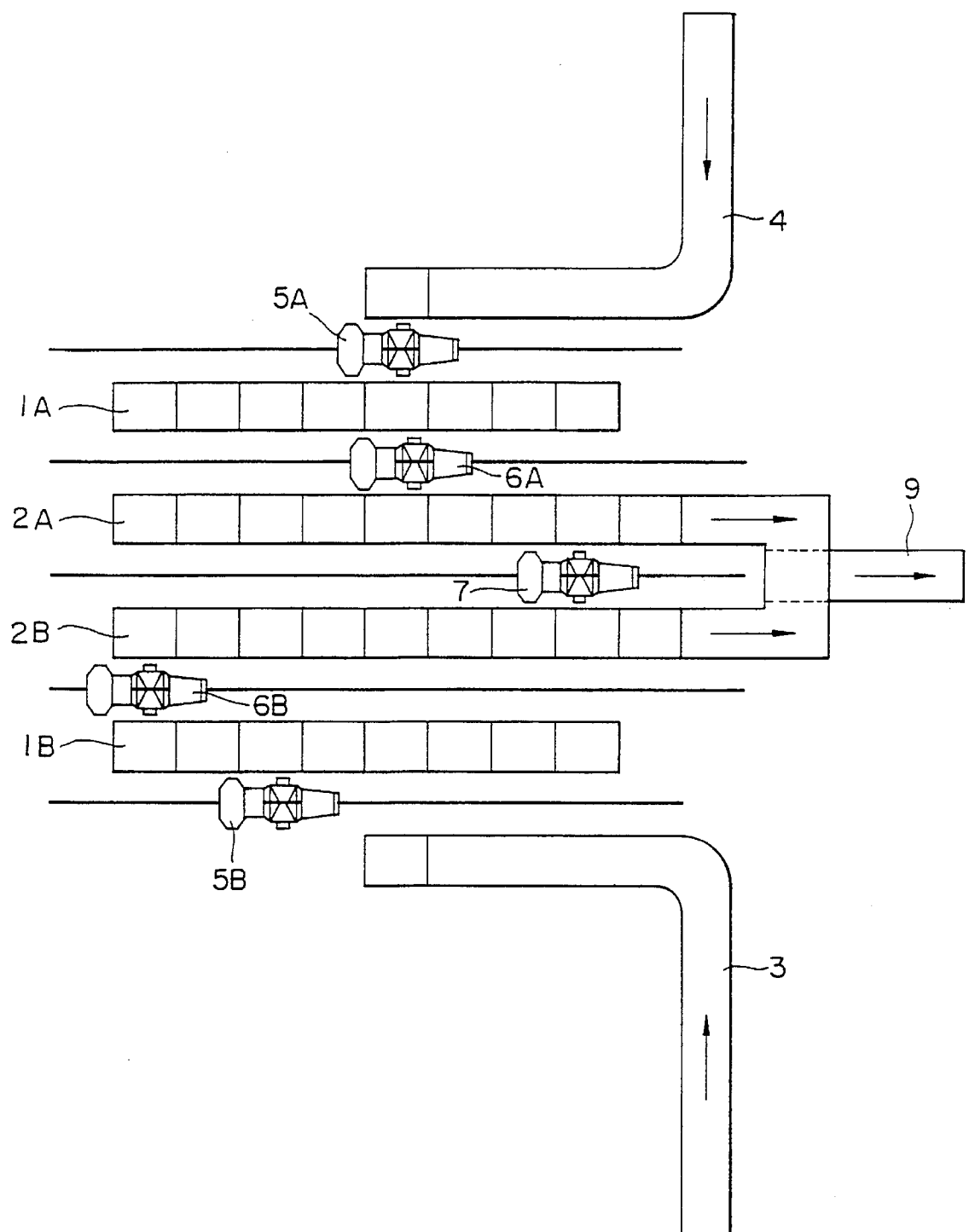
FIG. 7 shows a plan view of another example of a combined installation according to the invention

FIG. 7 shows the fifth embodiment of the present invention. This arrangement employs two pairs of racks and five cranes. The two pairs of racks (1A, 2A and 1B, 2B) are arranged as to be parallel to each other with their sides, leaving a corridor between the two racks of each pair. The cranes are disposed one within each of the three corridors between the racks and one at each of the outer sides of the racks. The two cranes 5A and 5B at the outer sides of the unit replenish articles from conveyors 4 and 3 as transfer means to the corresponding replenishing racks 1A and 1B, respectively. These two cranes 5A and 5B operate as replenishing mechanisms. The crane 7 disposed in the center of the unit picks articles up from the corresponding picking racks 2A and 2B. This crane 7 operates as picking mechanism. The other two cranes 6A and 6B disposed between replenishing racks 1A, 1B and picking racks 2A, 2B shift articles to be shifted from the replenishing racks 1A, 1B onto the picking racks 2A, 2B. These two cranes 6A and 6B operate as shifting mechanisms.

Figure 8:
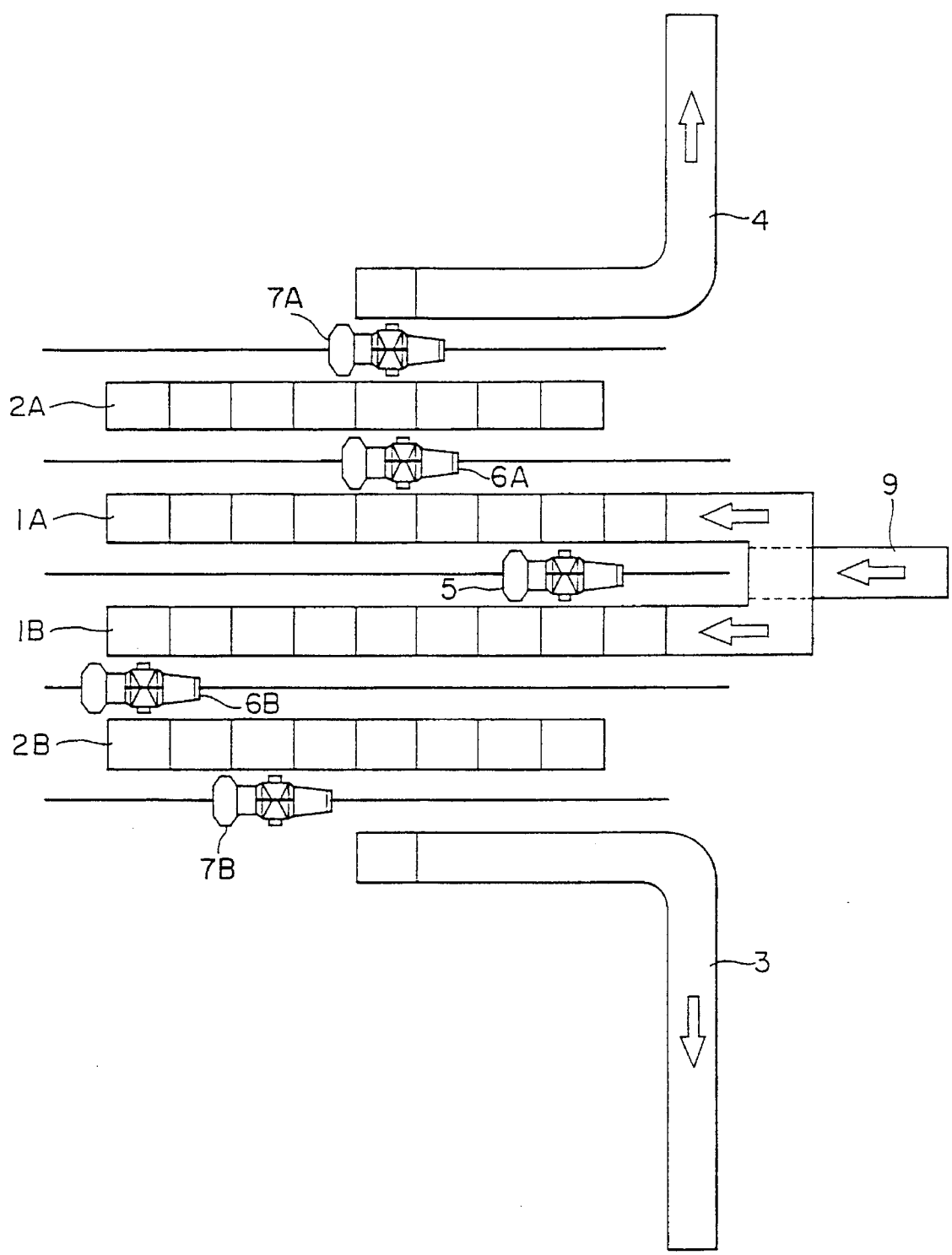
FIG. 8 shows a plan view of another example of a combined installation according to the invention.

FIG. 8 shows the sixth embodiment having a similar arrangement as shown in the embodiment of FIG. 7. However, the flows of articles are reversed. Accordingly, the outermost two cranes 7A and 7B are picking mechanisms and the center crane 5 is replenishing mechanism.

Figure 9:
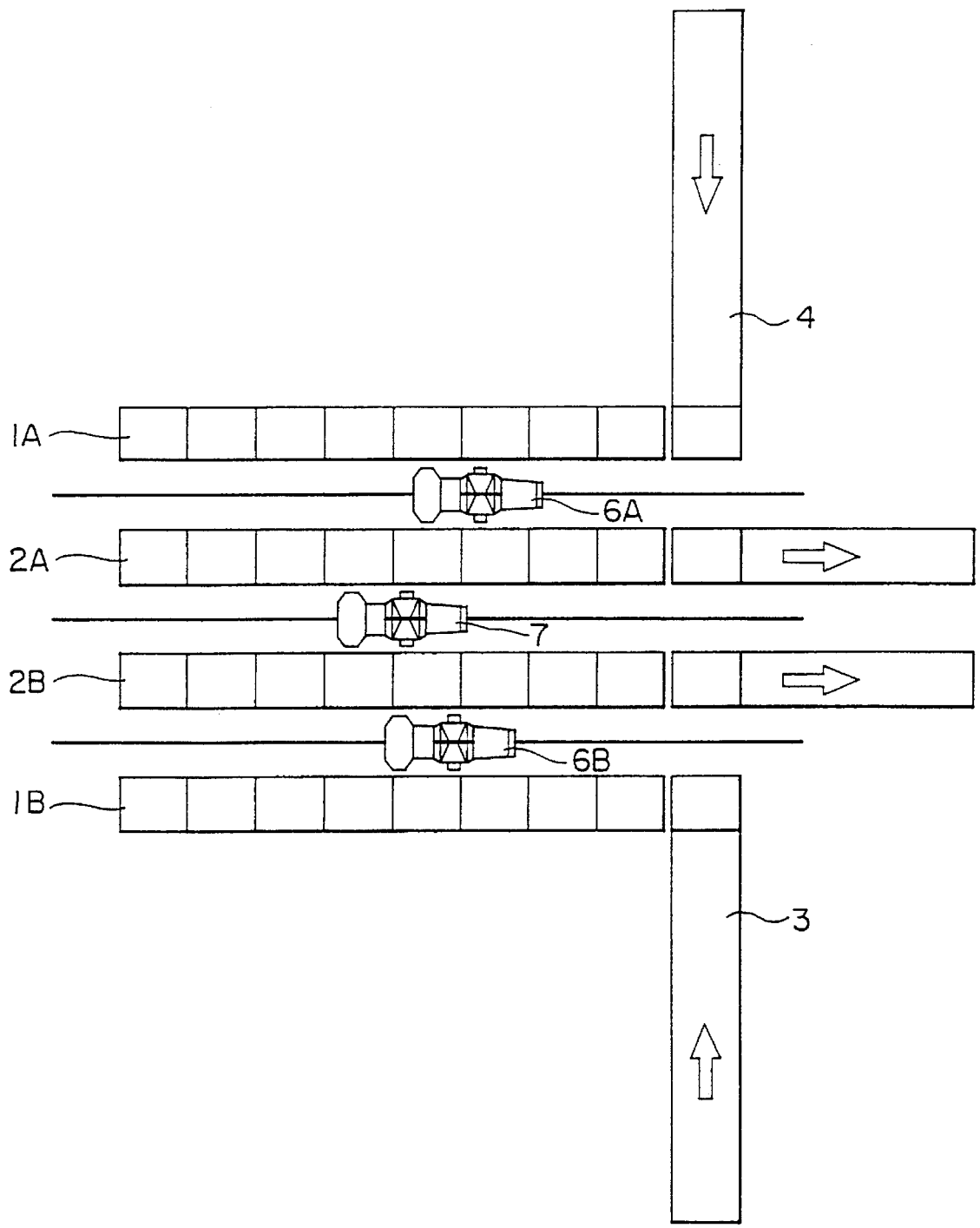
FIG. 9 shows a plan view of another example of a combined installation according to the invention.

FIG. 9 shows the seventh embodiment in which two pairs of racks (1A, 2A and 1B, 2B) and three cranes (6A, 6B, 7) are provided. The racks 1A and 2A are replenishing racks and the racks 1B and 2B are the picking racks. The cranes 6A and 6B provided between racks 1A and 2A, and between racks 1B and 2B respectively operate as shifting mechanisms which shift articles from the replenishing racks 1A, 1B onto the picking racks 2A, 2B. The crane 7 provided in the center corridor picks articles to be picked from the two related picking racks 2A and 2B.

Furthermore, various variations of the invention are imaginable.

For example, the cranes or forklifts will be arranged in combination with conveyors, carts or the like for transferring pallets, crates, buckets, articles or the like from the warehousing berth to the cranes or forklifts (transfer for replenishing) and from the cranes or forklifts to the delivery berth (transfer from picking).

The system according to the present invention differs from conventional systems in that it does not use gravity roller tracks for transferring the pallets, crates, buckets, articles or the like, but exclusively uses computer controlled electronic apparatus, allowing storage and removal of pallets, crates, buckets, articles or the like in a considerably shorter time than with conventional systems.

The idea of the invention is to reduce the number of operational movements of the shifting mechanisms to a minimum, so that concentration on the remaining movements is achieved. Whereas conventional systems are based on shifting mechanisms determined to carry out replenishing as well as shifting as well as picking, the present invention separates the works and uses three different shifting mechanisms, each for a different work: One for replenishing, one for shifting and one for picking. As a result, each of the shifting mechanisms can operate faster and different operations like picking and replenishing can be carried out at the same time, so that the whole storage process can be carried out with much higher frequency than conventional systems. Furthermore, the concentration on one kind of work and also the smoother operation of the shifting mechanisms reduces erroneous work down to a minimum.

What is claimed is:

1. An automatic warehouse having at least one stock unit for stocking articles, each of said stock units comprising:

a replenishing rack having a plurality of first shelves in height and length directions, each of a size of only one article, for stocking articles, each of said first shelves having an inlet opening, an outlet opening, at least support means for supporting said stocking article;

a picking rack having a plurality of second shelves in height and length directions, each of the size of only one stocking article, for stocking stocking articles so as to be picked out, each of said second shelves having an inlet opening, an outlet opening, at least support means for supporting said stocking articles;

said replenishing and picking racks being substantially identical, corresponding to each other, and arranged so as to oppose the outlet opening side of the first shelves with the inlet opening side of the second shelves, leaving a corridor therebetween;

a shifting mechanism which can access substantially all of the opposed shelf openings, said shifting mechanism being disposed within said corridor for shifting the stocking articles from the replenishing rack onto the picking rack when a number of stocking articles within the picking rack is reduced below a predetermined number;

a replenishing mechanism for replenishing the shelves to be replenished in the replenishing rack;

a picking mechanism for picking the stocking articles in the picking rack;

first transfer means for transferring the stocking articles from a warehousing berth having a stage for receiving stocking articles to be stored to the replenishing mechanism, said first transfer means having first conveying means for conveying received stocking articles; and second transfer means for transferring the stocking articles from the picking mechanism to a delivery berth having a stage for delivering stocking articles to be shipped, said second transfer means having second conveying means for conveying the stocking articles to be shipped;

whereby replenishment and delivery of the stocking articles can occur substantially at the same time.

2. The automatic warehouse according to claim 1, wherein said picking mechanism, said shifting mechanism and said replenishing mechanism are of the same type of mechanism.

3. The automatic warehouse according to claim 1, wherein said picking mechanism is provided in a center of the arrangement and two replenishing mechanisms are provided at outer sides of the racks.

4. The automatic warehouse according to claim 1, wherein said replenishing mechanism is provided in a center of the arrangement and two picking mechanisms are provided at outer sides of the racks.

5. The automatic warehouse according to claim 1, wherein which further comprises another similar stock unit being arranged such that the picking mechanisms of both units can be replaced by only one picking mechanism picking articles to be picked up from both picking racks.

6. The automatic warehouse according to claim 5, which further comprises one additional replenishing rack at each of outer sides of the unit arranged such that the replenishing mechanisms replenish both the outer replenishing rack and the inner picking rack, and shifting articles from the replenishing rack onto the picking rack.

7. The automatic warehouse according to claim 1, which further comprises another similar stock unit arranged such that the replenishing mechanisms of both units can be replaced by only one replenishing mechanism for replenishing both replenishing racks.

8. An automatic warehouse having at least one stock unit for stocking articles, each of said stock units comprising:

a replenishing rack having a plurality of first shelves in height and length directions, each of said first shelves being of a size of only one stocking article, for stocking stocking articles to be replenished, each of said first shelves having an inlet opening, outlet opening, at least one support means for supporting said stocking article;

a picking rack having a plurality of second shelves in height and length directions, each of said second shelves being of the size of only one stocking article, for stocking stocking articles so as to be picked out, each of said second shelves having an inlet opening, outlet opening, at least support means for supporting said article, said second shelves being allocated for the stocking articles in response to respective shipping requirement priorities;

said replenishing and picking racks being substantially identical, corresponding to each other, and arranged so as to oppose the outlet opening side of the first shelves with the inlet opening side of the second shelves, defining a corridor therebetween;

a shifting mechanism which can access substantially all of the opposed shelf openings, said shifting mechanism being located within said corridor for shifting the stocking articles from the replenishing rack onto the picking rack when a number of the stocking articles within the picking rack is reduced below a predetermined number;

a replenishing mechanism for replenishing the shelves to be replenished in the replenishing rack;

a picking mechanism for picking stocking articles in the picking rack;

first transfer means for transferring the stocking articles from a warehousing berth having a stage for receiving the stocking articles to be stored to the replenishing mechanism, said first transfer means having first conveying means for conveying received stocking articles;

second transfer means for transferring the stocking articles from the picking mechanism to a delivery berth having a stage for delivering the stocking articles to be shipped, said second transfer means having second conveying means for conveying the stocking articles to be shipped, and control means for controlling said replenishing mechanism, said picking mechanism and said shifting mechanism to sort stocking articles having high priority to shelves located near said delivery berth and to pick up the stocking articles;

whereby replenishment and delivery of the stocking articles can occur substantially at the same time.

9. The automatic warehouse according to claim 8, wherein said priority is based on delivery quantity of articles.

10. The automatic warehouse according to claim 8, wherein said priority is based on perishability of articles.

11. An automatic warehouse for stock management of a plurality of discrete articles, comprising:

a replenishing rack defining a selected height and length having a first side and a second side;

a picking rack having a height and length corresponding to that of said replenishing rack and being substantially identical thereto, said picking rack having a first side and a second side, said second side of said replenishing rack facing said first side of said picking rack with a corridor defined therebetween, said replenishing rack including a plurality of first shelves extending in height and length directions, each of said first shelves being spaced apart and dimensioned to receive, support and store one discrete article, and each of said first shelves being accessible from said first and second sides;

said picking rack for the discrete articles including a plurality of second shelves extending in height and length directions, each of said second shelves being dimensioned to receive and support said one discrete article from said corresponding replenishing shelf, and each of said second shelves being accessible from said first and second sides where the second side of said first shelves is spaced apart from, opposed to and corresponds with the first side of said second shelves;

a shifting mechanism which can access substantially all of the opposed shelves, said shifting mechanism being located within said corridor for shifting the discrete articles from the second side of said first shelves of the replenishing rack to the first side of the corresponding second shelf of the picking rack when a number of the discrete articles contained on said the picking rack is reduced below a predetermined number;

a replenishing mechanism for replenishing the first shelves of the replenishing rack from which the discrete articles have been shifted by said shifting mechanism, said replenishing mechanism replenishing said first shelves from said first side of said replenishing rack;

a picking mechanism for replenishing the second shelves of the picking rack from which the discrete articles have been shifted by said shifting mechanism, said replenishing mechanism replenishing said first shelves from said first side of said replenishing rack the shelves to be replenished in the picking rack where replenishment and delivery of the discrete articles can occur substantially at the same time;

first transfer means for transferring the discrete articles to the replenishing mechanism from a warehousing berth, said first transfer means having first conveying means for conveying the discrete articles; and second transfer means for transferring the discrete articles from the picking mechanism to a delivery berth, said second transfer means having second conveying means for conveying the discrete articles to be shipped.

12. The automatic warehouse for stock management according to claim 11 where the shifting mechanism, the replenishing mechanism and the picking mechanism are cranes.

13. The automatic warehouse for stock management according to claim 12 where said transfer means are automatic carts.

14. The automatic warehouse for stock management according to claim 11 where said transfer means are conveyors.

* * * * *